US008562024B2

(12) United States Patent
Schulken

(10) Patent No.: US 8,562,024 B2
(45) Date of Patent: Oct. 22, 2013

(54) NUMBER WRITING DEVELOPMENT GUIDE

(75) Inventor: Toni Schulken, Charlotte, NC (US)

(73) Assignee: ACCO Brands Corporation, Lake Zurich, IL (US)

(*) Notice: Subject to any disclaimer, the term of this patent is extended or adjusted under 35 U.S.C. 154(b) by 511 days.

(21) Appl. No.: 12/205,198

(22) Filed: Sep. 5, 2008

(65) Prior Publication Data

US 2009/0068626 A1 Mar. 12, 2009

Related U.S. Application Data

(63) Continuation-in-part of application No. 11/853,411, filed on Sep. 11, 2007, now Pat. No. 7,819,433.

(51) Int. Cl.
| | |
|---|---|
| G09B 11/00 | (2006.01) |
| G09B 19/08 | (2006.01) |
| G09B 19/02 | (2006.01) |
| G09B 23/02 | (2006.01) |
| G09B 17/02 | (2006.01) |

(52) U.S. Cl.
USPC .............................. 283/45; 283/44; 283/46

(58) Field of Classification Search
USPC ....................... 283/44, 45, 46, 117
See application file for complete search history.

(56) References Cited

U.S. PATENT DOCUMENTS

| | | | |
|---|---|---|---|
| 3,731,402 A | 5/1973 | Paul | |
| 4,173,082 A * | 11/1979 | Niquette | 283/45 |
| 4,669,986 A * | 6/1987 | Yokoyama | 434/164 |
| 5,102,338 A | 4/1992 | Kapiloff | |
| 6,302,696 B1 | 10/2001 | O'Neill | |
| 6,579,100 B1 | 6/2003 | Clark et al. | |
| 2006/0084040 A1 | 4/2006 | Schulken | |
| 2006/0121424 A1 | 6/2006 | Ford et al. | |
| 2008/0131852 A1 * | 6/2008 | Van Hofwegen | 434/165 |

FOREIGN PATENT DOCUMENTS

| | | |
|---|---|---|
| CA | 2275905 | 12/2000 |
| CA | 2331948 | 12/2000 |
| WO | WO 03/067557 | 8/2003 |
| WO | WO 2004/107292 | 9/2004 |

* cited by examiner

*Primary Examiner* — Dana Ross
*Assistant Examiner* — Justin V Lewis
(74) *Attorney, Agent, or Firm* — Thompson Hine L.L.P.

(57) ABSTRACT

A number writing development guide including a number guide sheet having sequential instruction indicia. The sequential instruction indicia includes discrete ordered steps that cue a user in proper writing strokes to write an associated number. At least one of the discrete ordered steps relates to a common childhood activity or experience to thereby form an association between the activity or experience and the sequential instruction indicia. The guide further includes a challenge sheet coupled to the number guide sheet and having number challenge indicia. The number challenge indicia cues the user to arrive at a numerical answer to the number challenge and write the numerical answer thereon.

12 Claims, 17 Drawing Sheets

Graphing

Fruit Stand! Everything at the fruit stand is all mixed up! Can you help sort everything out? Go to page 38 and cut out the fruit. Put them in boxes above the fruit pictures.

= How many apples are for sale? _____

= How many grapes are for sale? _____

= How many oranges are for sale? 10

= How many pears are for sale? 12

Let's Measure

Using a ruler

Cut out the ruler on page 39. Look around your house to find the objects below in your house. Record the inches in the yellow box.

40

Cracker _____ inches

Pencil _____ inches   10

Cup _____ inches   12

Glue bottles _____ inches

Foot _____ inches

Hand _____ inches

Dollar _____ inches

Crayon _____ inches

40

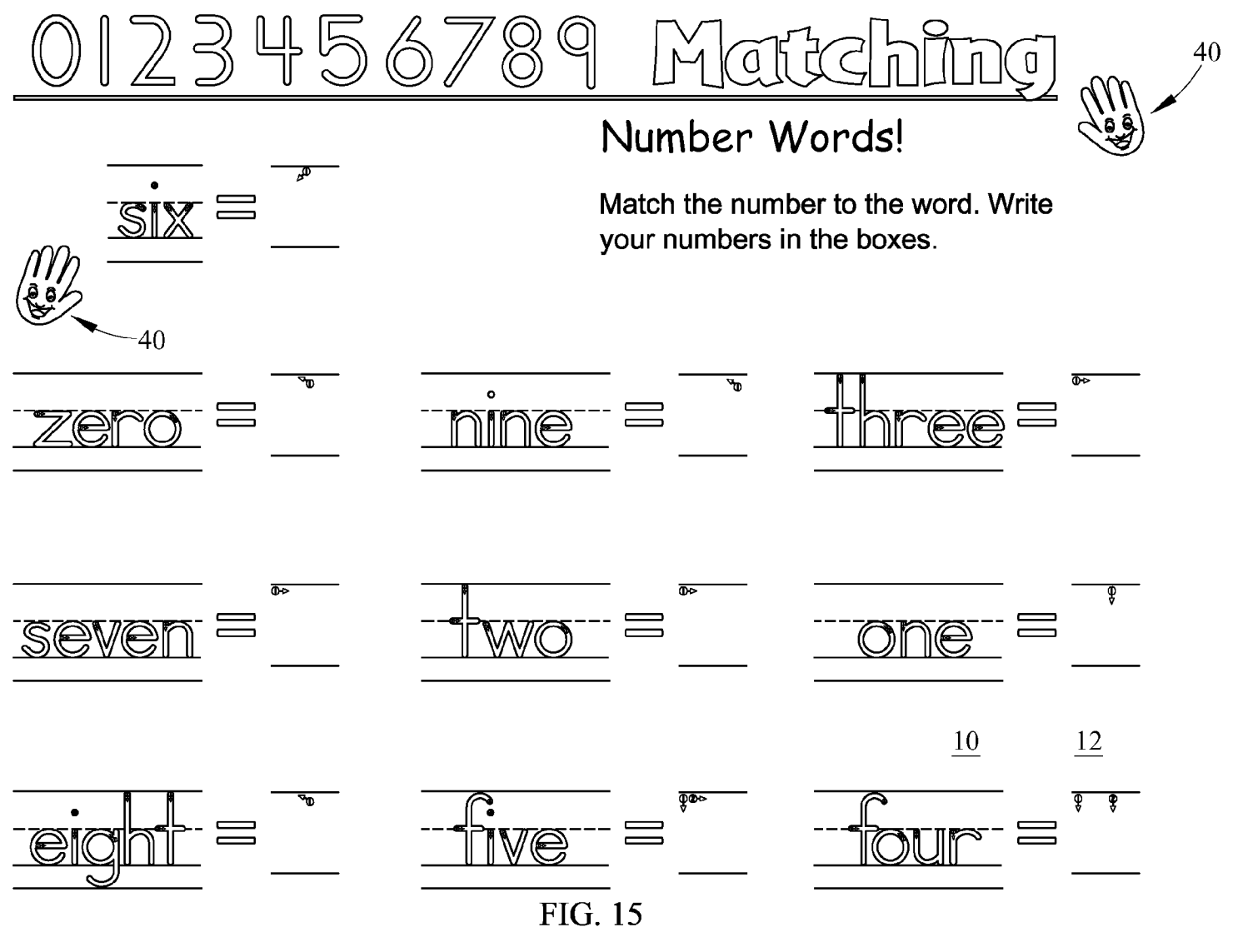

0123456789 Matching

Number Words!

Match the number to the word. Write your numbers in the boxes.

six = ___
nine = ___
three = ___ zero = ___
two = ___  10
one = ___ seven = ___
five = ___
four = ___  12 eight = ___

FIG. 15

Subtraction

Yum! Are you hungry? Let's eat pizza to learn subtraction! A pizza is made up of 8 pieces. Cut out ✂ the 8 pieces on page 40 and use them to help you solve these math questions.

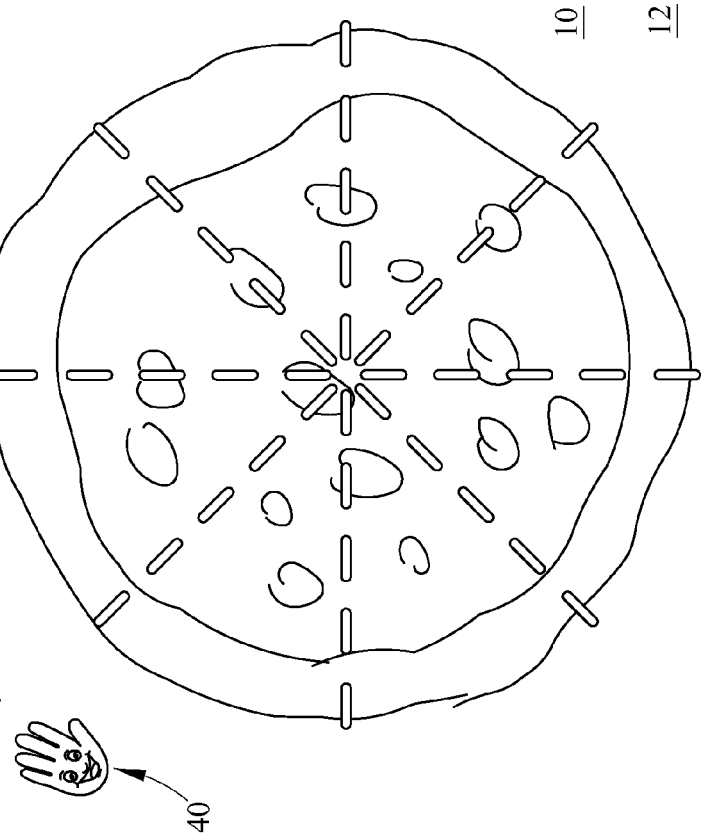

How many pieces are left if 1 piece is eaten?
8 − 1 = ☐

How many pieces are left if 3 pieces are eaten?
8 − 3 = ☐

How many pieces are left if 6 pieces are eaten?
8 − 6 = ☐

Use the pieces to try some of your own subtraction problems!

FIG. 16

NUMBER WRITING DEVELOPMENT GUIDE

This application is a continuation-in-part of U.S. patent application Ser. No. 11/853,411, entitled LETTER GUIDE SHEET, filed on Sep. 12, 2007, the entire contents of which are incorporated by reference The present invention is directed to a sheet for developing a user's writing skills, and more particularly, to a sheet for developing a user's letter or number writing skills and early math skills.

BACKGROUND

As children and other users learn to write letter and numbers, it is important to teach the proper form of the letter or numbers, as well as proper stroke direction (i.e. directionality of letter and number formation). Moreover, users should be taught continuity of letter and number formation which results in increased legibility and leads to an easier transition to cursive writing.

SUMMARY

In one embodiment, the invention is a number writing development guide including a number guide sheet having sequential instruction indicia. The sequential instruction indicia includes discrete ordered steps that cue a user in proper writing strokes to write an associated number. At least one of the discrete ordered steps relates to a common childhood activity or experience to thereby form an association between the activity or experience and the sequential instruction indicia. The guide further includes a challenge sheet coupled to the number guide sheet and having number challenge indicia. The number challenge indicia cues the user to arrive at a numerical answer to the number challenge and write the numerical answer thereon.

BRIEF DESCRIPTION OF THE DRAWINGS

FIGS. 3-16 illustrate various instruction sheet which develop various number, counting, and early math skills.

DETAILED DESCRIPTION

The system of the present invention may include various types of instruction sheets, examples of which are shown in one or more of FIGS. 1-16, arranged in order of increasing complexity to aid the user in number writing skill development and in maintaining proper number formation while simultaneously solving basic math challenges. Only one or two of each type of instruction sheet is shown herein. However, it should be understood that a plurality of each type of instruction sheet, each having varying indicia, may be grouped together to allow the user to develop a single set of skills through repetition of that type of instruction sheet before progressing to the next type of instruction sheets. However, if desired only a single instruction sheet of each type may be provided. Further alternately, various types of instructions may be combined on a single sheet.

The instruction sheets may be arranged in order such that the first instruction sheets provide instructions and skill development relating to basic alphanumeric writing skills, and the later (and more advanced) instruction sheets provide instructions and skill development relating to more complex and advanced numerical-based skills while continuing to cue the user to maintain proper number formation. The sheets may have a variety of shapes and/or sizes, but in one embodiment the sheets are generally rectangular, having dimensions of 8.5"×12". Accordingly, FIGS. 1-16 illustrate sheets that are shown to scale, at least for one embodiment.

Each sheet 10 may include or take the form of a sheet-like material 12 which can be made of from any of a wide variety of materials. However, the sheets 10/sheet-like material 12 may be made of a cellulose-based or pulp-based paper such that the sheets 10/sheet-like material 12 are generally water absorbent and can be written upon by a wide variety of media (i.e. pens, pencils, markers, crayons, etc.) However, the sheets 10/sheet-like material 12 can be made of any of a relatively wide variety of materials, and need not necessarily be of a water-absorbent material (i.e. could be a write-on/wipe off (polymer) material that can be re-used, etc.) The instruction sheets 10/sheet-like material 12 may be relatively thin, and may have a thickness of about 0.5 mm or less.

Figure 1:
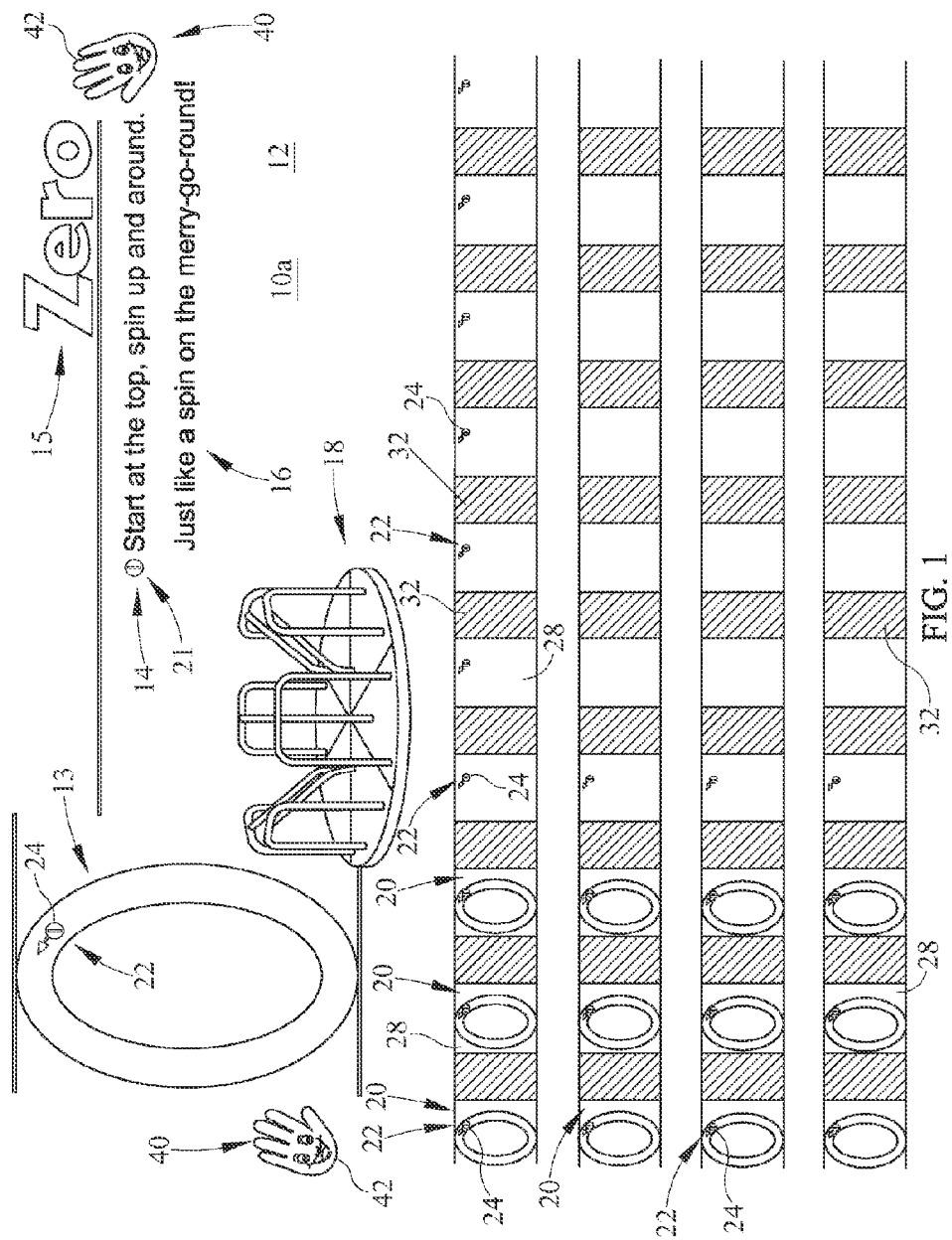
FIG. 1 illustrates an instruction sheet which cues a user how to write the number 0.
Figure 2:
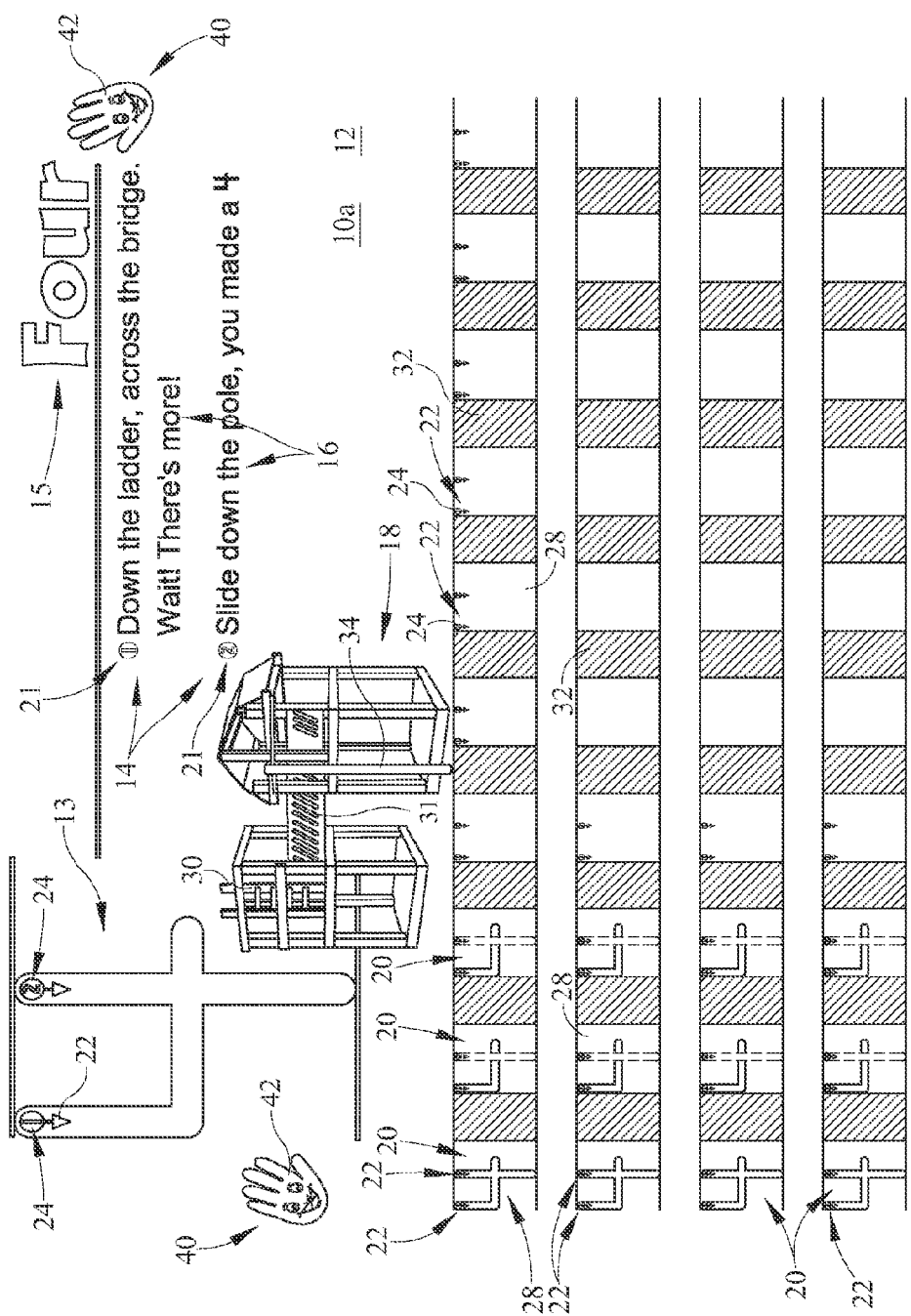
FIG. 2 illustrates an instruction sheet which cues a user how to write the number 4.

As shown in FIGS. 1 and 2, the first instruction sheets 10a or number guide sheets provide indicia and guides for teaching a user how to properly write numbers (or letters, in another embodiment). The first instruction sheets 10a shown in FIGS. 1 and 2 are similar to the instruction sheets shown in U.S. patent application Ser. No. 11/853,411, entitled LETTER GUIDE SHEET, filed on Sep. 12, 2007, the entire contents of which are incorporated by reference herein.

Each first instruction sheet 10a may be directed to developing writing skills for a particular number. For example, each first instruction sheet 10a may include a large, prominent version 13 of the number associated with that sheet 10a written in numerical format. Each first instruction sheet 10a may also include the associated number written in text format 15, sequential instruction indicia 14 including numbered steps 21 and narrative text 16 (which depicts proper number formation), a visual representation 18, and a traceable version 20 of the associated number printed thereon.

The traceable version 20 of the number (or letter) may be presented as a relatively thin or light line, a shaded line, a non-black line and/or an incomplete line which is printed in dotted or dashed format. The traceable version 20 may be formatted in this manner so that a user can write over the traceable version 20 and easily distinguish which portions of the traceable version 20 are pre-printed, and which portions have been written by the user.

Each traceable version 20 (as well as the large version 13 of the associated number for that sheet 10a) may have one or more guide or directional arrows 22. In addition, numerical indicia or cues 24 may be superimposed on the traceable version 20, or placed adjacent to the traceable version 20 and associated with the guide arrows 22. The guide arrows 22 and numerical cues 24 provide discrete ordered steps that teach or cue a user in the proper writing strokes to write the associated letter or number. The ordered steps thereby encourage a user to learn proper directional sequence for letter or number writing. The guide arrows 22 and numerical cues 24 also help to show the user the proper starting point for writing strokes within a writing space 28, helping to ensure proper number formation and avoid number reversals.

In the illustrated embodiment, each guide arrow 22 is numbered with the numerical cue 24 superimposed thereon. Alternately, each numerical cue 24 may be positioned immediately adjacent to the associated guide arrow 22. Moreover, the numerical cue 24, associated arrow 22 and/or the associated portion of the traceable version 20, may be linked together, such as by a common color, pattern, shading, texture, etc. For example, in FIG. 2, in one case the "L"-shaped portion of the traceable version of the number "4" is red. The associated guide arrow 22 and/or numerical cue 24 may also be red. In this example the long vertical portion of the traceable version 20 of the number "4" may be green, and the associated guide arrow 22 and/or numerical cue 24 may also be green.

In the illustrated embodiment, each differing stroke of the traceable version 20 of the letter or number is written in a differing color (or pattern, shading, texture, etc.) Thus a user knows that when there is a change in color, a new writing stroke is presented and the user should pick up his or her writing instrument from the sheet 10 for placement at a new location to start the next writing stroke. Accordingly, if the number is presented in two different colors, then two guide arrows 22 and numerical cues 24 can be expected to be presented for that number. Conversely, when there is no change in color (as may be the case for the number "0" in FIG. 1), the user is cued to keep their writing instrument on the sheet 10, thereby reinforcing writing continuity which results in increased legibility and efficiency.

The instruction indicia 14 may include numbered steps 21 that correspond to the numerical cues 24 associated with the traceable version 20 of the number. The instruction indicia 14 may also include the narrative text or a narrative portion 16 associated with each numbered step 21 that reinforces the cues provided by the guide arrow 22 associated with the traceable version 20 of the number. For example, in the sheet 10a of FIG. 2, the narrative text 16 associated with the first numbered step 21 reads "Down the ladder, across the bridge." This text implies/instructs a user to draw a vertical line in a downward motion, and then a horizontal line. Thus this text 16 reinforces the actions required to draw the first portion of the number "4," which increases the user's retention of motor patterns required for proper number formation.

The narrative text 16 next to the second numbered step 21 includes the text "Slide down a pole." This text 16 obviously implies a downward vertical movement, which corresponds to the second action required to draw the number "4." Thus, the narrative text 16 of the instruction indicia 14 may describe an object or activity that is symbolic of the associated writing step.

The narrative 16 text may be presented in a rhyming pattern to improve the user's retention of information. Moreover, rather than strictly using text, other indicia, such as drawings, picture, diagrams or the like may be utilized to provide a visual representation of familiar actions in the narrative portion 16 to guide the user to complete an action (i.e. a pencil may be represented for drawing steps, scissors may be represented for cutting steps, etc.) as required for the task. This use of visual representations may increase direction-following skills in the young learner.

The numbered steps 21 and/or narrative text 16 can be visually linked to the larger version 13/traceable version 20 of the number, such as by a common color, pattern, shading, texture, etc. For example, the numbered step "1" of the instruction indicia 14, and/or the associated narrative text 16 or surrounding portions, can be printed with a color corresponding to the color of the associated part of the traceable version 20 of the number. Thus, continuing with the example above, the number step "1" of the instruction indicia 14 (and/or the associated narrative text 16) is printed in or otherwise associated with the color red, matching the "L" shaped portion of the traceable version 20 of the number "4." Conversely, the numbered step "2" of the instruction indicia 14 (and/or the associated narrative text 16) is printed in, or otherwise associated with the color green, matching the long vertical portion of the larger version 13/traceable version 20 of the number "4." The use of color can significantly increase a user's retention of information (increasing retention up to 60% in certain cases).

The visual representation 18 on the sheet 10a can also aid in reinforcing the proper writing strokes. In particular, the visual representation 18 may provide a visual representation that corresponds to the instruction indicia 14 and the larger version 13/traceable version 20. For example, the illustrated embodiment the visual representation 18 takes the form of a play structure or clubhouse including a ladder 30, a bridge 31 and a pole 34. Thus the visual representation 18 includes components (the ladder 30, bridge 31 and pole 34) that are described in the narrative text 16, thereby linking number formation with a common childhood activity or experience.

Moreover, the ladder 30 and bridge 31 of the play structure may have the same color, pattern, shading, texture, etc. as is associated with the instruction indicia 14/traceable version 20. Accordingly, in the illustrated embodiment the ladder 30 and bridge 31 of the visual representation 18 are shown primarily in red, and the pole 34 is shown primarily in green. Thus, when a user is instructed, for example, in the green-cued narrative text 16, to the "slide down the pole," the appropriate action is reinforced by the green pole 34 illustrated in the visual representation 18. Moreover, the ladder 30, bridge 31 and pole 34 in the visual representation are arranged in a manner to present a rough depiction of the number "4".

Accordingly it can be seen that the narrative text 16, along with the visual representation 18, provides a "story" which is easy for the user to learn and remember, as opposed to having to rely upon rote memorization to learn the shapes and line stroke order of each letter or number. For example, when writing the number "4" the user need only remember the visual image of climbing "down the ladder, across the bridge, and down the pole." Therefore the shape of the number, as well as the appropriate writing strokes and their order, can all be easily and naturally recalled. This multi-sensory approach to teaching number formation utilizes auditory, color and other visual, and non-visual, cues. The action words or cues may be based on childhood play experiences that will be familiar to the user.

Once the user has written/traced the letter or number on the larger version 13/traceable version 20, as taught by the instruction indicia 14, the visual representation, and the arrows 22 and numerical cues 24, the user can utilize various block/writing spaces 28 provided on the sheet 10a to reinforce the lessons. Each horizontal row of blocks 28 may begin with a traceable version 20 of the letter or number. Arrows 22 and numerical cues 24 may be provided. Subsequent blocks 28 (in a left-to-right progression) may include a lighter or partial version of the traceable version 20. Even more subsequent blocks 28 may omit the traceable version 20, leaving only the arrows 21 and numerical cues 24. Finally, the arrows 22 and numerical cues 24 may be omitted to provide blank writing spaces 28 to allow the user to write each letter or number without any direct guidance.

In this manner, as a user works left-to-right across a row, the user receives progressively less instructions and cuing to allow a user to learn how to write each letter or number without direct guidance. In addition, each row provides numerous opportunities for a user to write the number (or letter) to learn by repetition. Each row of writing blocks 28 may have spacers 32 between each block to teach a user proper spacing of the written letters/numbers.

Each block 28 may each be printed on/filled with a fill color, such as yellow. The yellow color attracts the user's attention, and provides less glare than white paper which results in less strain on the eye for greater visual endurance for the young learner. This can be particularly useful for children who are not used to visually focusing on close work (i.e. paper and pencil tasks) for long periods of time. A yellow fill color is also easy to write upon and provides sufficient contrast with pencils and other writing instruments. However, various other fill colors besides yellow, such as rose, light blue or the like may be utilized.

Each instruction sheet 10 may include or carry thereon at least one hand cue 40 upon which a user can place his or her non-dominant hand to manually stabilize the associated sheet 10 while writing. Each hand cue 40 may include or take the form of a visual cue 42. In the illustrated embodiment, the visual cue 42 takes the form of a visual representation (i.e. drawing, design, photograph or the like) of a hand to cue or encourage a user to place his or her hand on the hand cue 40. However, the visual cue 42 can take the form of other indicia besides a hand. For example some other indicia 42 (by way of example, a star, or the letter "H," although nearly any sort of indicia can be used) may be provided on the instruction sheet 10. A user may be taught (i.e. by the instruction sheet 10, associated instructions/packaging, by a teacher, or parent, etc.) that the indicia 42 is to be associated with paper stabilization.

In this case, when a user sees the visual cue 42 the user is prompted to stabilize the instruction sheet 10 with his or her non-dominant (i.e. non-writing) hand. Teachers typically have difficulty ensuring that their students properly stabilize their writing sheets during use. Accordingly, the hand cues 40 serve as a constant reminder to the user to encourage proper stabilization and use of the instruction sheet 10.

The instruction sheets 10a shown in FIGS. 1 and 2 may be packaged with, coupled to, or bound with a plurality of additional first instruction sheets 10a (i.e. may be bound thereto as part of a pad, notebook or the like). If desired, a first instruction sheet 10a for each Arabic number 0-9 may be provided. Each first instruction sheet 10a may have the same basic format but with varying instruction indicia 14, narrative text 16, and visual representations 18, etc. to teach writing skills for the different letters or numbers.

Figure 3:
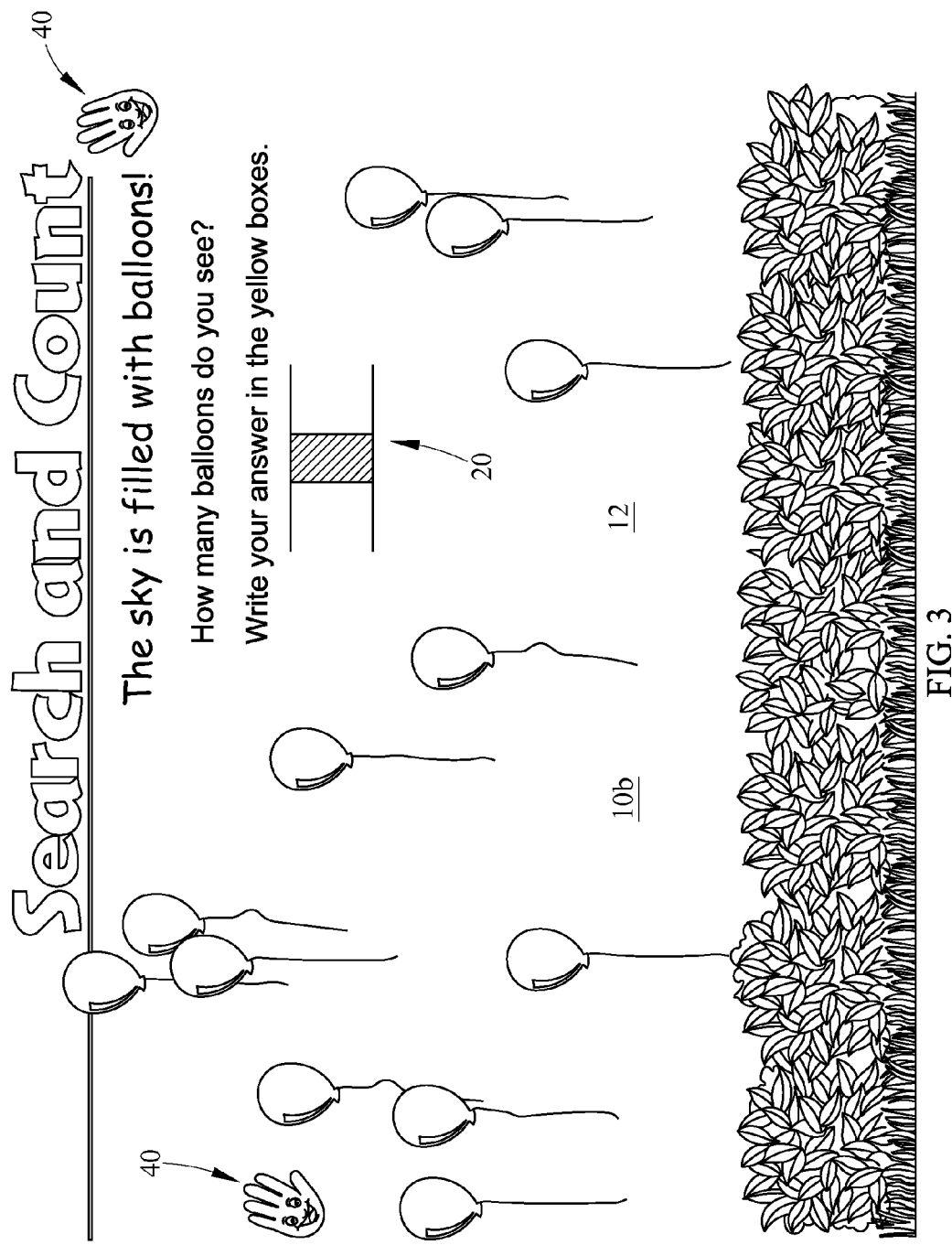

Once the first set of instruction sheets 10a are completed, the user may advance to more advanced instruction sheets or challenge sheets, such as the second set of instruction sheets 10b, an example of which is shown in FIG. 3. These sheets 10b include a number of items to be found and counted by the user, and the user is then cued to write the number of found items on the writing spaces 28. In this manner, the second set of instruction sheets 10b develop counting and visual tracking skills, help a user to recognize and utilize one-to-one correspondence when counting objects or pictures, and encourage further use of proper number writing skills developed through use of the first set of instruction sheets 10a.

Figure 4:
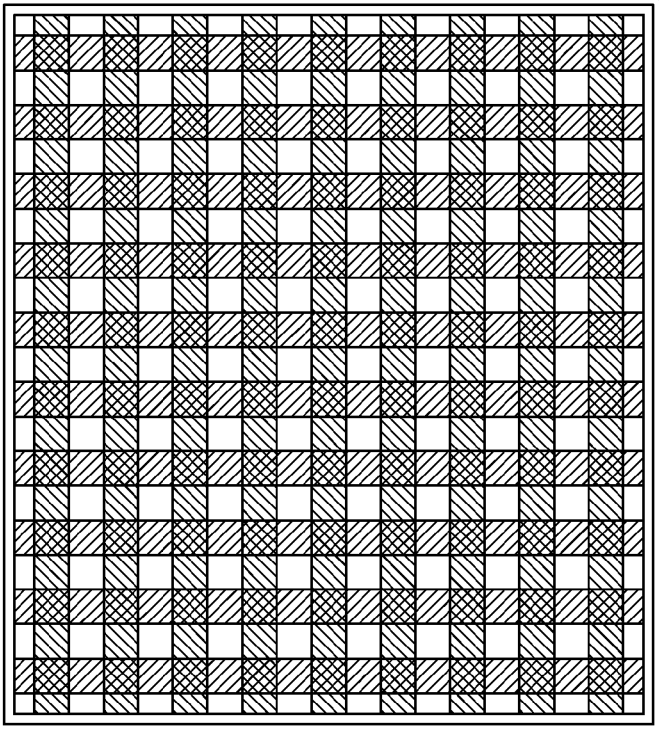
Figure 4:
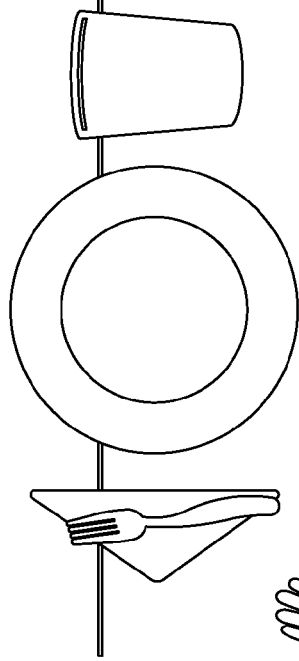
Figure 4:
Figure 4A:
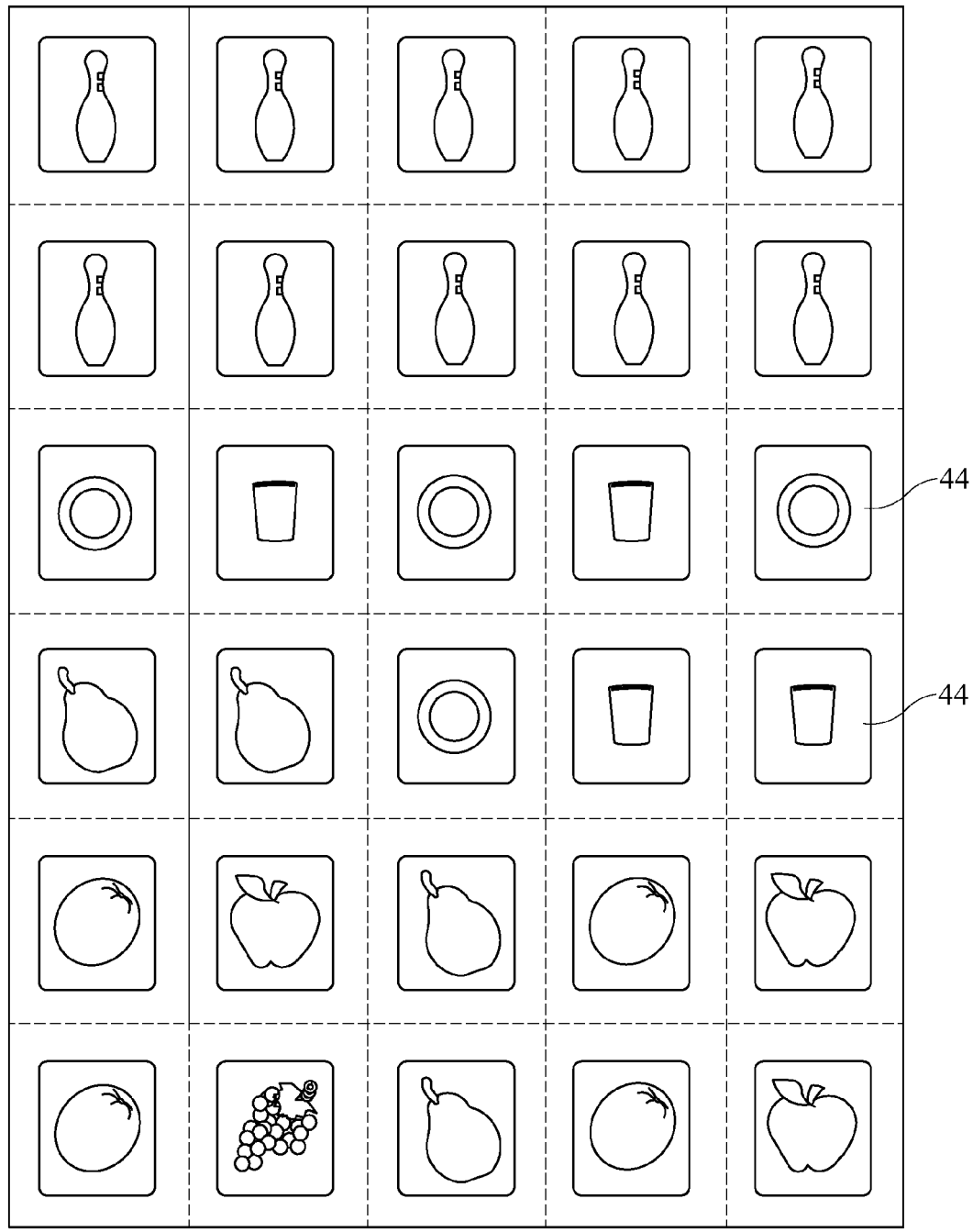
Figure 5:
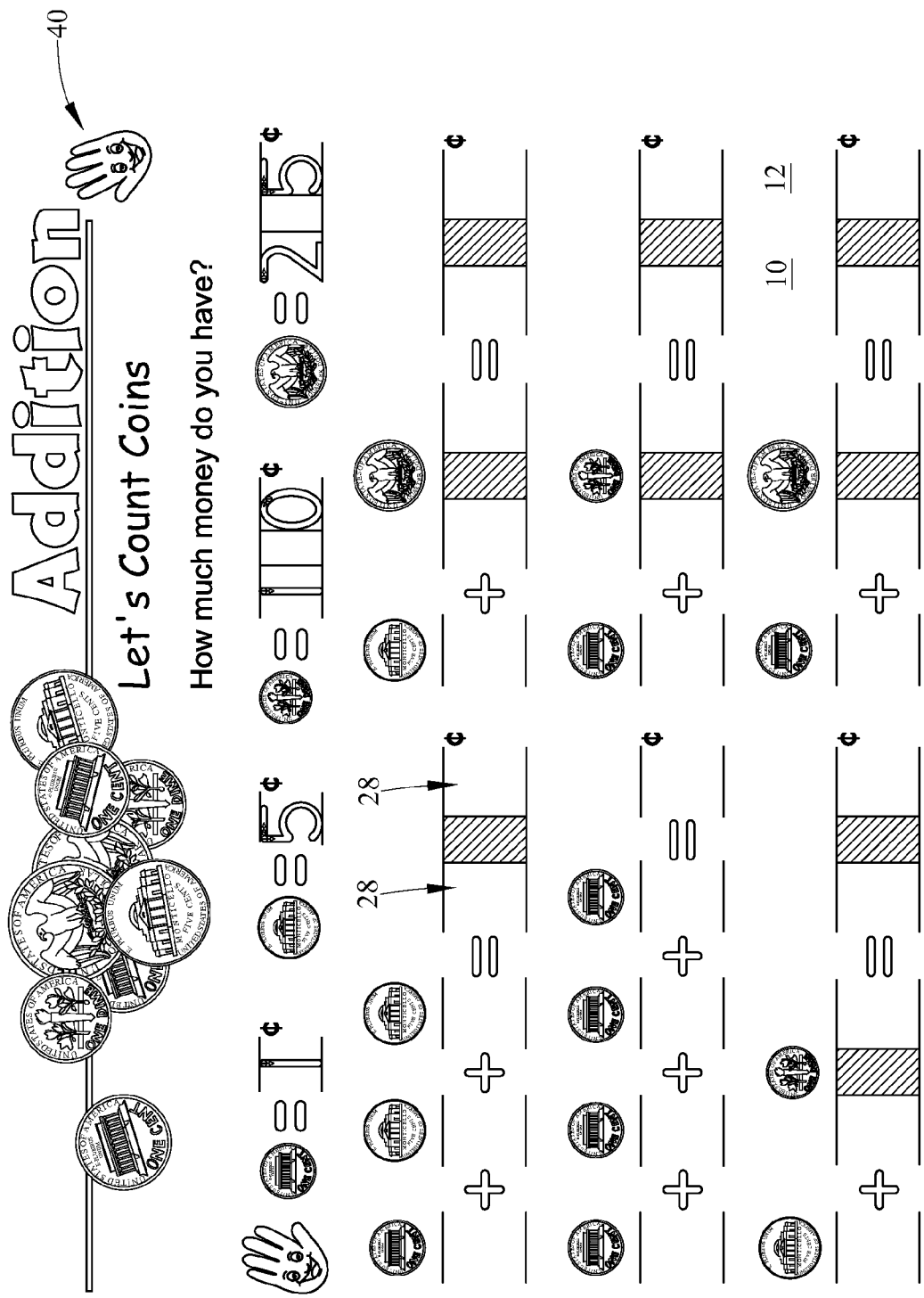
Figure 6:
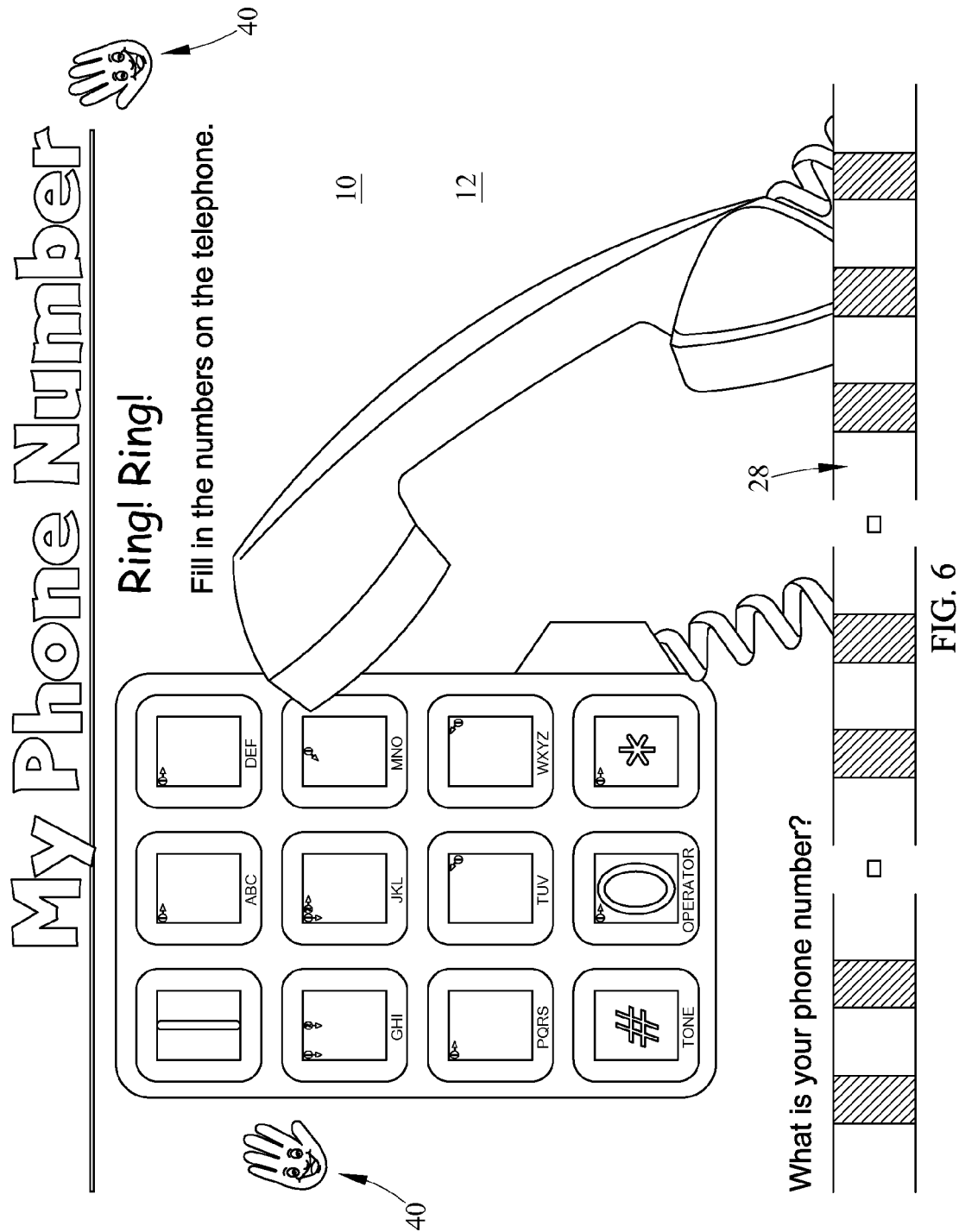
Figure 7:
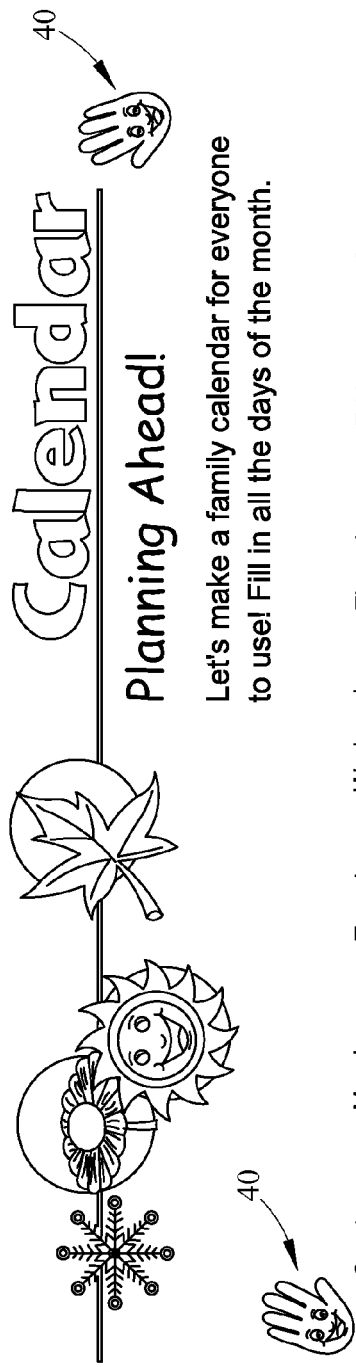
Figure 7:
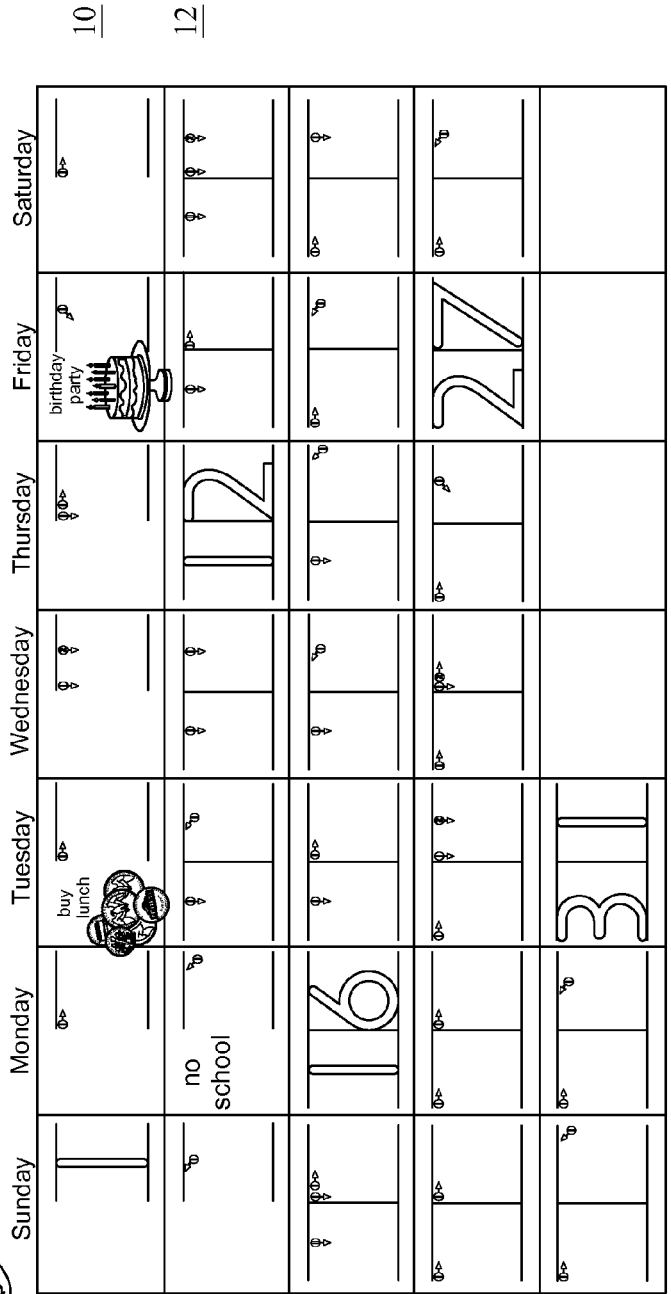
Figure 8:
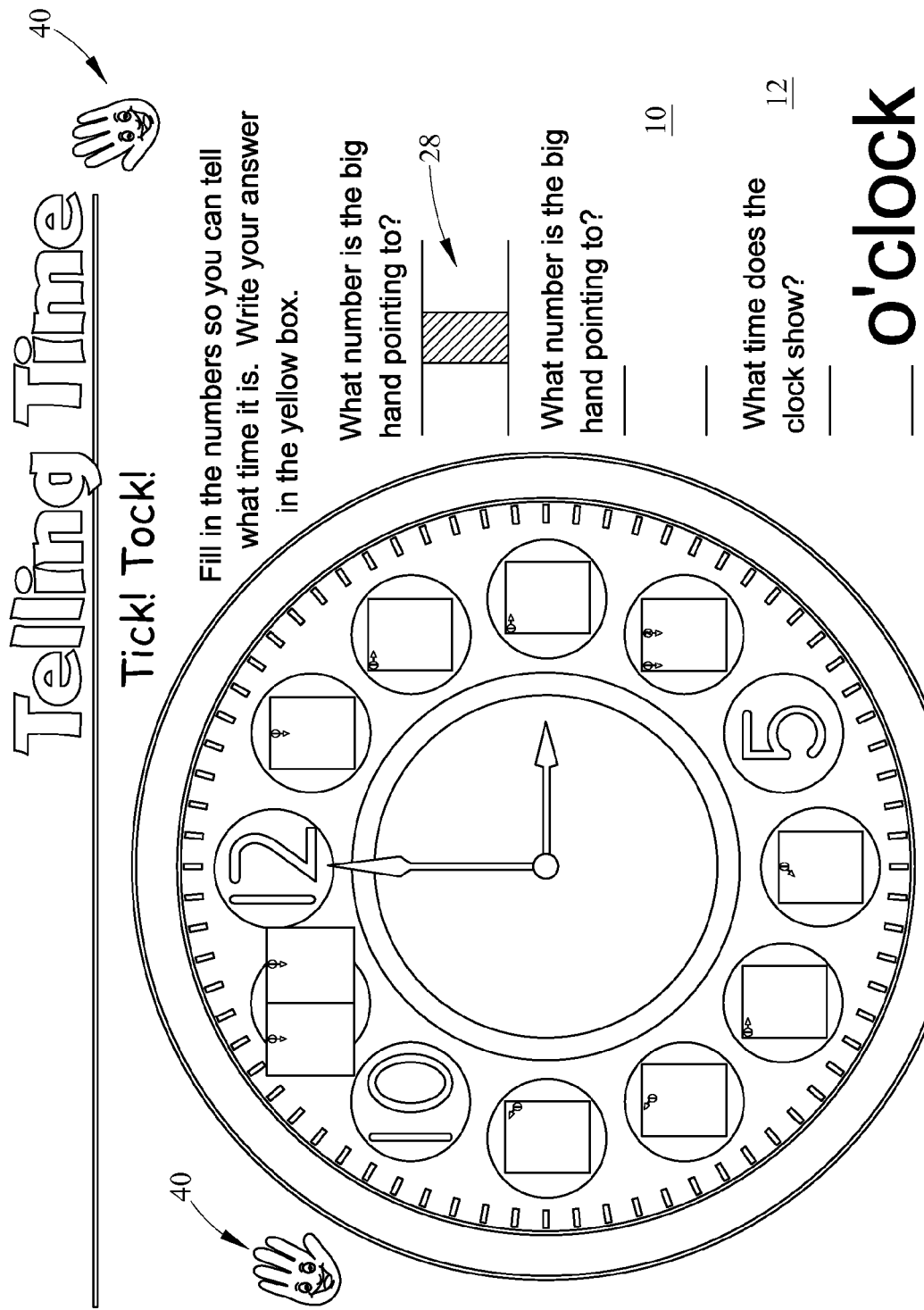
Figure 9:
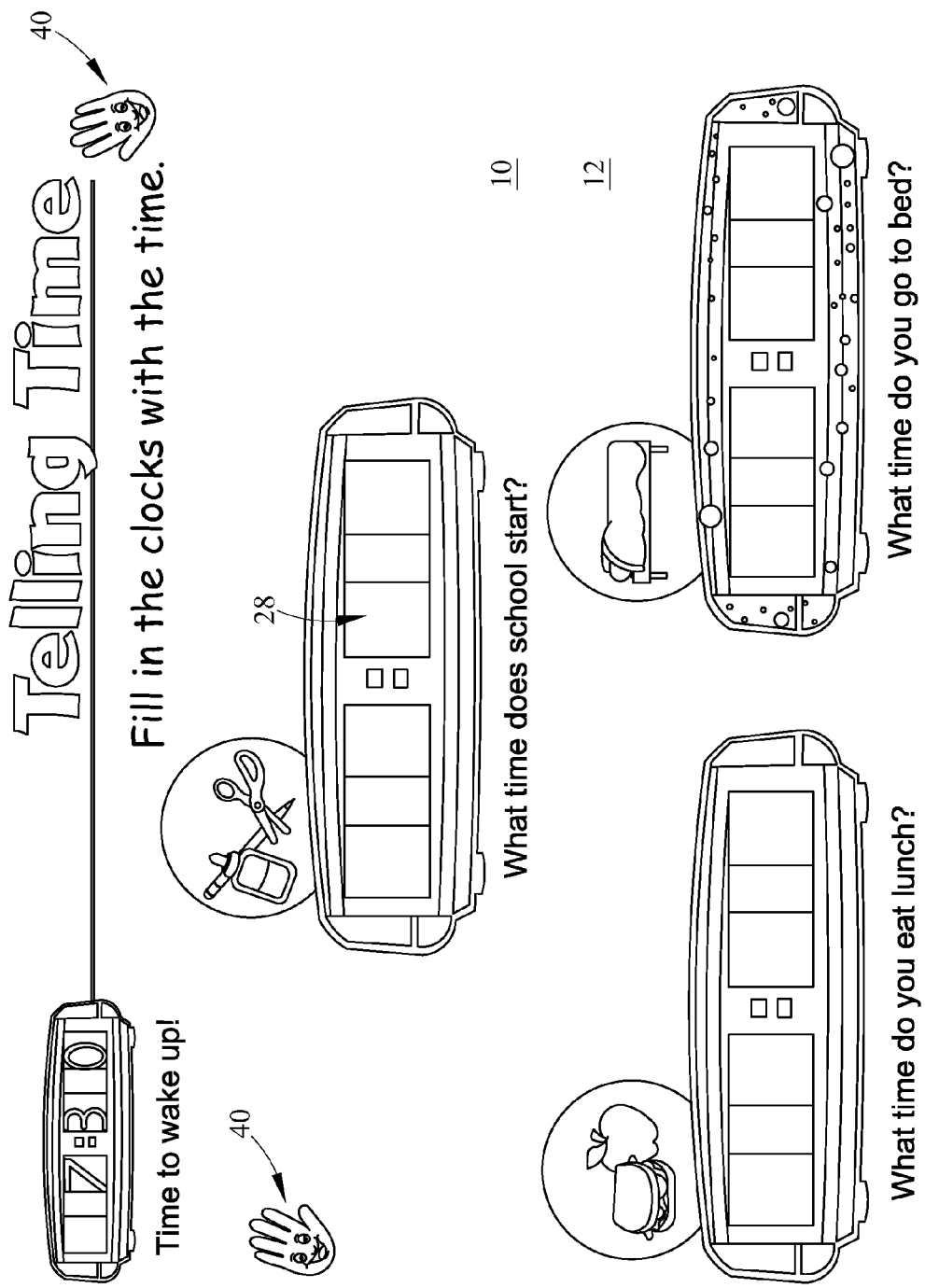
Figure 10:
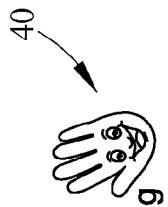
Figure 10:
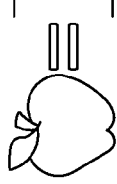
Figure 10:
Figure 10:
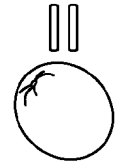
Figure 10:
Figure 10:
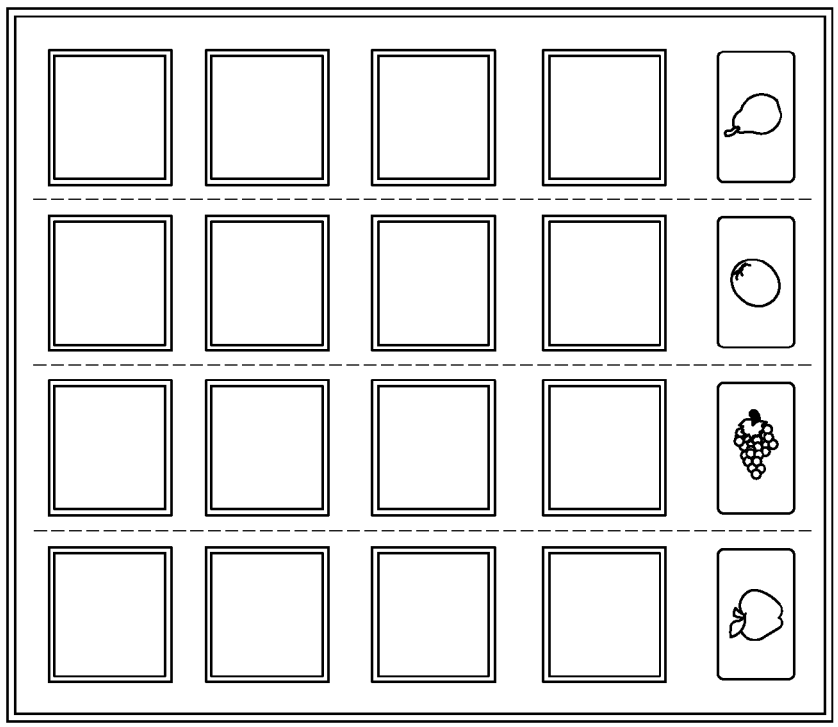
Figure 10:

Once the second set of instruction sheets 10b are completed, the user may advance to the third set of instruction sheets or challenge sheets 10c, examples of which are shown in FIGS. 4 and 4A. The sheet of FIG. 4 direct the user to cut out two different manipulatives 44 (from the sheet of FIG. 4A, in the illustrated embodiment), resulting in manipulable items 44 that are separated from the sheet of FIG. 4A and can be positioned on the sheet of FIG. 4. These user is then cued to count the number of first manipulatives (i.e. plates, in one case), and write the number of first manipulatives in the cued location. The user is then cued to count the number of second manipulatives (i.e. cups, in one case), and write the number of second manipulatives in the cued location. The user is then cued to copy the number of first and second manipulatives in the designated spaces having a "+" symbol positioned therebetween.

The user is then cued to add the numbers together, and write the answer in the space provided. In this manner, the third set of instruction sheets 10c develops fine motor skills, counting and basic arithmetic skills through the use of manipulatives, and encourages further use of the number writing skills developed in use of the first set of instruction sheets. In addition, the third set of instruction sheets 10c allow a user more unconstrained use. For example, the use of the manipulatives in the sheets 10c of FIGS. 4 and 4A allows the user to position the cup and plate manipulatives as desired on the "table," and to use varying numbers of cups and plates. In this manner the user creates their own math challenge. The third set of instruction sheets 10c (and other sets using manipulatives) can thereby be used multiple times in varying manners. In addition, the booklet/guide can provide various manipulatives in the pages of the booklet/guide such that the manipulatives are provided and immediately available. In this manner the user is not required to find manipulatives on his or her own.

The remaining instruction sheets develop further skills in the user, particularly mathematical and other number manipulation skills, and number writing skills. For example, the sheet of FIG. 5 teaches users the money valuation of coins and encourages counting/adding skills using coins; the sheet of FIG. 6 encourages number writing skills and encourages number writing skills in sequence so that the user can learn his or her phone number; the sheet of FIG. 7 encourages number writing skills and numerical sequencing; the sheets of FIGS. 8 and 9 encourage number writing, counting, and time-telling skills; the sheet of FIG. 10 encourages cutting (fine motor) skills, sorting, counting, and graphing skills; the sheet of FIG. 11 encourages physical activity, counting, and number writing skills; the sheet of FIG. 12 encourages cutting (fine motor) skills, and measuring skills; the sheet of FIG. 13 encourages backward counting skills and reinforces number formation; the sheet of FIG. 14 encourages cutting (fine motor) skills, visual form constancy, visual figure ground and visual discrimination skills, as well as number counting and number writing; the sheet of FIG. 15 encourages the recognition of number words and their relation to the associated numerical representation; and the sheet of FIG. 16 encourages cutting (fine motor) skills, counting, and subtraction skills using manipulatives. Answers to the challenges presented by the various sheets may be provided on subsequent sheets (not shown). All of these sheets also encourages further use of the number writing skills developed in use of the first set of instruction sheets.

Figure 11:
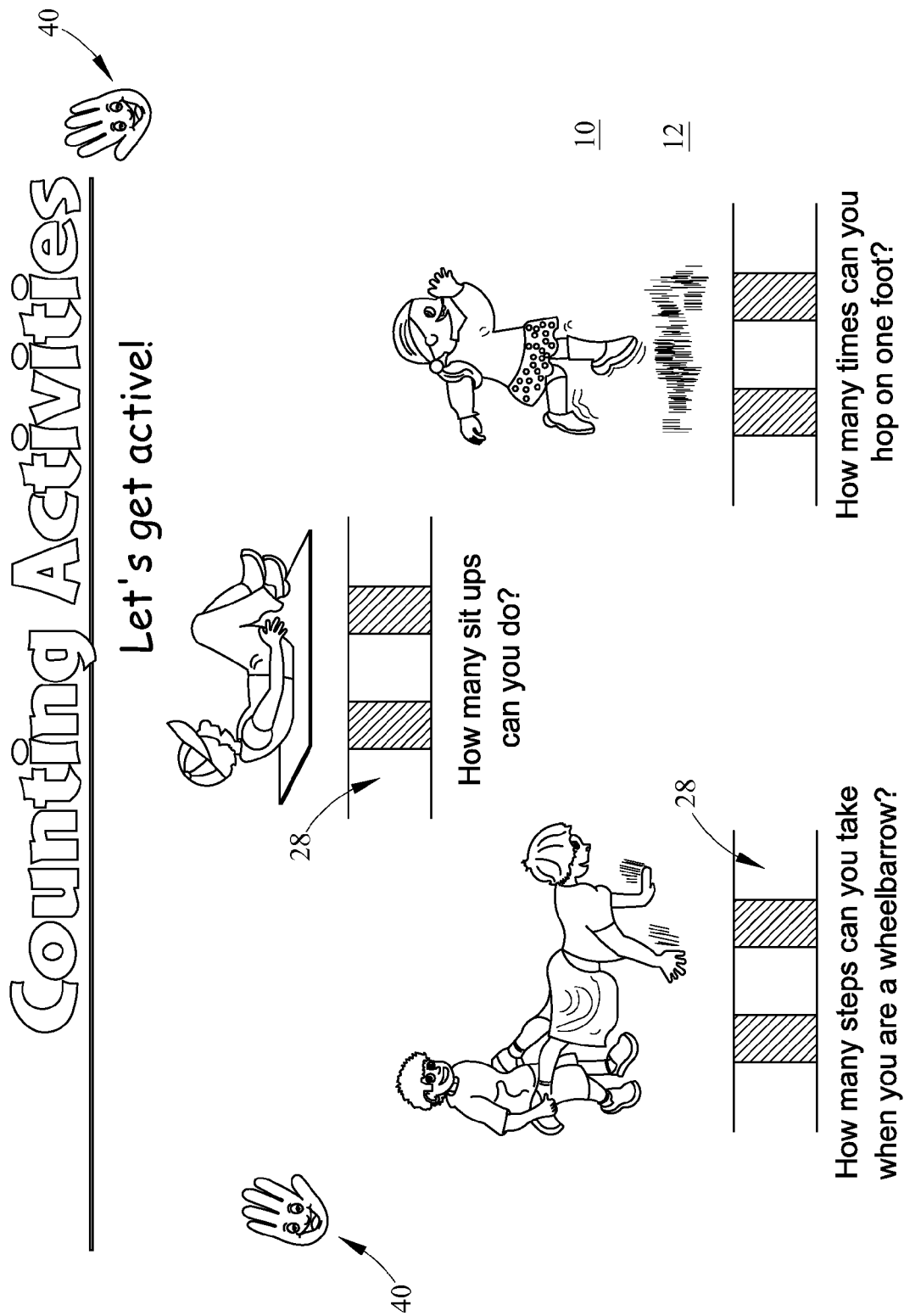
Figure 12:
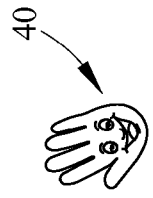
Figure 12:
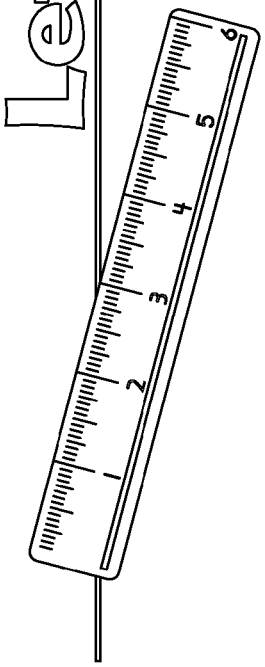
Figure 12:
Figure 13:
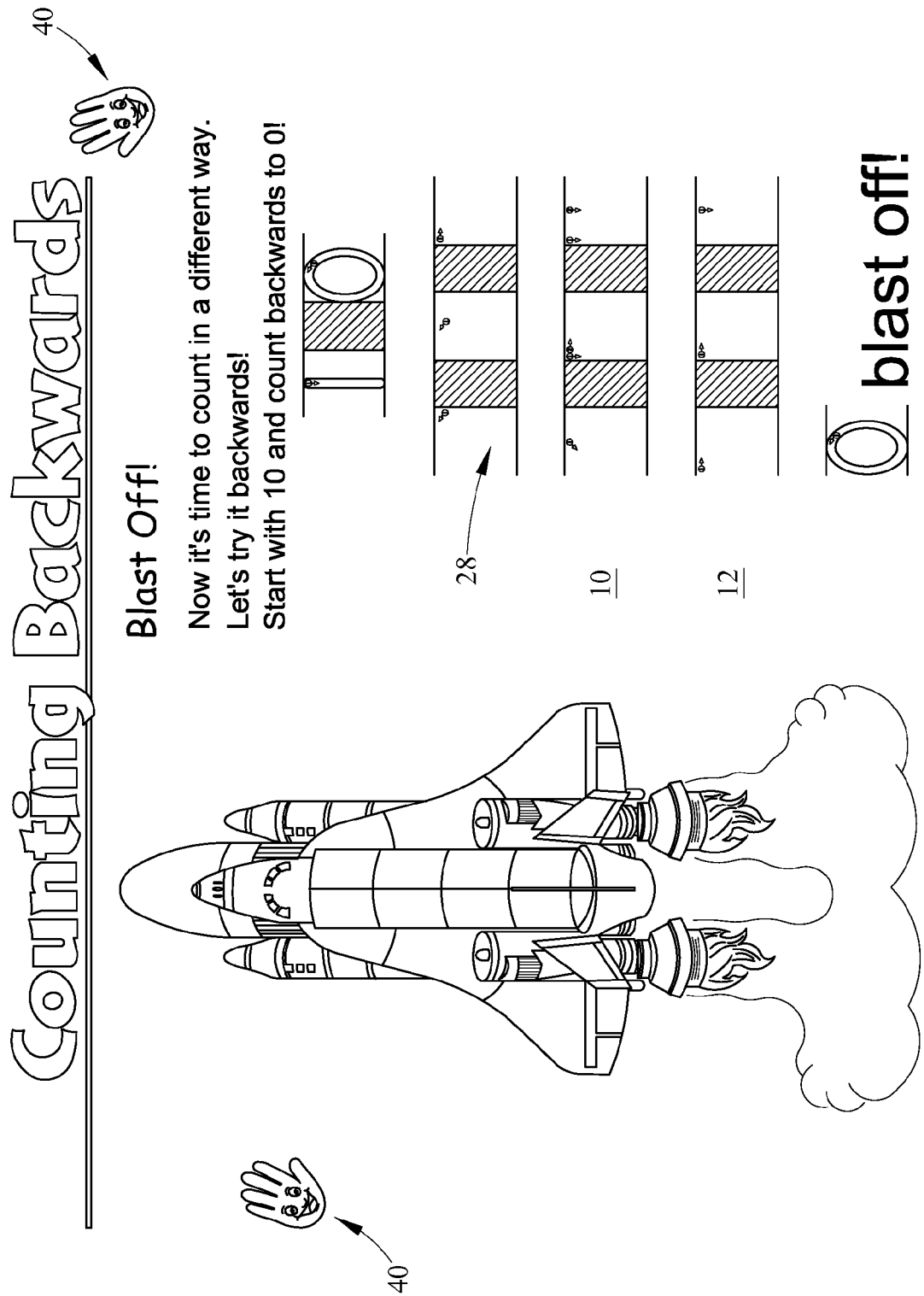
Figure 14:
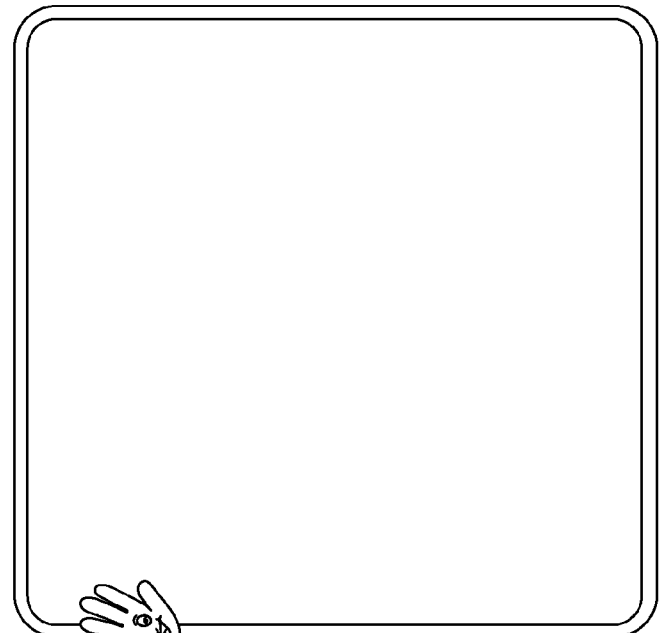

The sheet of FIG. 11 encourages a user to undertake physical activity (i.e. doing a wheel barrow activity with a helper, doing sit-ups, or hopping on one foot). The sheet may thus cue or encourage physical activities which raise the user's heartbeat in an appreciable manner to help encourage physical fitness. These physical challenges also exploit or implement research showing that children have improved learning when utilizing physical activity.

The "boxes" or writing spaces 28 provided on the various sheets (i.e. shown in FIGS. 4-6, 8, 9, 11, 13 and 14) cue the user to remember and utilize proper number writing technique. In some cases the sheets may include the directional 22 and/or numerical cues 24 (i.e. shown in FIGS. 7, 13, 15 and 16) to further reinforce proper number writing technique.

Proper writing habits includes making vertical and diagonal lines from top-to-bottom, making circles from the top and counterclockwise toward the left, and making horizontal lines from left-to-right. Teaching a user to develop these habits prepares a child for proper letter and number writing. Moreover, learning to follow a visual sequence is important in learning to follow multi-step directions. In addition learning a particular sequence in shape and number writing can increase legibility and writing fluency (speed and accuracy). Finally, learning to use various lines and curves to construct an object, especially learning to use continuous strokes (rather than unnecessarily lifting the writing instrument) further aides the user in the development of the underlying skills needed for proper letter and number formation. The instruction sheets 10 teach these skills, and also teach the ability to draw within boundaries and the directionality of letter and number formation.

Having described the invention in detail and by reference to the various embodiments, it should be understood that modifications and variations thereof are possible without departing from the scope of the invention.

What is claimed is:

1. A method for teaching a person to write a number on a number writing development guide comprising:
    providing sequential instruction indicia on said number writing development guide, the sequential instruction indicia including discrete ordered steps that cue a user to use proper writing strokes to write an associated number;
    wherein at least one of said discrete ordered steps relates to an object or activity that is symbolic of at least one of the writing strokes; and
    providing number challenge indicia on said number writing development guide, wherein said number challenge indicia cues the user to arrive at a numerical answer to said number challenge indicia and write the numerical answer thereon.

2. The method of claim 1 wherein the number challenge indicia cue a user to mathematically manipulate numbers.

3. The method of claim 1 further comprising the step of providing narrative indicia having discrete portions that correspond to the discrete ordered steps of the sequential instruction indicia.

4. The method of claim 3 wherein each discrete portion of said narrative indicia is associated with a discrete ordered step of the sequential instruction indicia by a color.

5. The method of claim 3 further comprising the step of providing a visual representation, said visual representation including components that visually correspond to text in said narrative indicia.

6. The method of claim 5 wherein said visual representation relates to a common childhood activity or experience.

7. The method of claim 5 wherein said components of said visual representation correspond to said text by color.

8. The method of claim 5 wherein said components of said visual representation are arranged to have a shape generally corresponding to said associated number.

9. The method of claim 1 wherein each of said discrete ordered steps relates to a common childhood activity or experience.

10. The method of claim 1 wherein said sequential instruction indicia includes a traceable version of a number, and a number and an arrow cuing a user where to begin a writing stroke.

11. The method of claim 1 further comprising the step of providing at least one manipulable item which a user is cued to separate from said supplemental challenge sheet and use in association with said challenge sheet.

12. The method of claim 1 wherein said number challenge indicia cues a user to undertake physical activity.

* * * * *